United States Patent [19]

Kuroyama et al.

[11] Patent Number: 4,851,258

[45] Date of Patent: Jul. 25, 1989

[54] METHOD FOR PREPARING MAGNETIC PARTICLES FOR MAGNETIC-RECORDING MEDIA

[75] Inventors: Shigefumi Kuroyama, Yokohama; Kenichi Okazaki, Kawasaki, both of Japan

[73] Assignee: Showa Denko Kabushiki Kaisha, Tokyo, Japan

[21] Appl. No.: 233,934

[22] Filed: Aug. 18, 1988

Related U.S. Application Data

[63] Continuation of Ser. No. 5,990, Jan. 21, 1987, abandoned.

[51] Int. Cl.$^4$ ............................................. C01G 49/06
[52] U.S. Cl. .................................. 427/127; 252/62.56; 252/62.63; 427/131
[58] Field of Search .................... 252/62.56, 62.63; 427/127, 131

[56] References Cited

U.S. PATENT DOCUMENTS 4,296,149  10/1981  Rudolf et al. ................... 252/62.56

FOREIGN PATENT DOCUMENTS

| 57-181102 | 11/1982 | Japan. | |
|---|---|---|---|
| 57-198607 | 12/1982 | Japan. | |
| 59-21529 | 2/1984 | Japan | 252/62.56 |
| 59-76402 | 5/1984 | Japan | 252/62.63 |
| 61-111508 | 5/1986 | Japan | 423/594 |

*Primary Examiner*—Jack Cooper
*Attorney, Agent, or Firm*—Sughrue, Mion, Zinn, Macpeak and Seas

[57] ABSTRACT

Magnetic particles of modified γ-ferric oxide particles for magnetic recording media which have excellent electrical conductivity, saturation magnetization, and print-through, and have a higher coercivity, are prepared by modifying γ-ferric oxide particles first with cobalt and then with ferrous iron, both in the presence of an alkaline earth metal salt in an alkaline solution containing the γ-ferric oxide particles dispersed therein.

3 Claims, 1 Drawing Sheet

METHOD FOR PREPARING MAGNETIC PARTICLES FOR MAGNETIC-RECORDING MEDIA

This is a continuation of application Ser. No. 5,990 filed Jan. 21, 1987, now abandoned.

BACKGROUND OF THE INVENTION

1. Field of the Invention

The present invention relates to a method for preparing magnetic particles for magnetic-recording media. More particularly, it relates to a method for preparing cobalt and ferrous iron surface modified γ-ferric oxide particles.

2. Description of the Related Art

Acicular chromium dioxide and acicular cobalt-modified magnetic iron oxide are widely used as high density magnetic recording media, but acicular chromium dioxide has disadvantages in that a magnetic tape using this dioxide causes a higher degree wear of a magnetic head than a conventional magnetic tape using an iron oxide, and the recorded magnetization of medium deteriorate repeat by repeat of play back. Since the Curie point of chromium dioxide is very low (about 126° C.), both the magnetization and coercivity decrease rapidly when the temperature is increased. Moreover, the problems of manufacturing cost and environment pollution, etc., arise. Acicular cobalt-containing magnetic iron oxide is generally available in two types; a so-called cobalt-doped magnetic iron oxide in which cobalt is diffused uniformly in the magnetic iron oxide particles, and a magnetic iron oxide in which cobalt is located only on the surface of the magnetic iron oxide particles. Of those two types of acicular cobalt-containing magnetic iron oxide particles, if cobalt content is same, the cobalt-doped type generally has a higher coercivity than cobalt surface modified type, viz., cobalt is located only on the surface of the particles. However, a magnetic tape is made, the cobalt-doped type acicular magnetic iron oxide particles have unstable magnetic problems and a problem of a level down of signal output by the times of play back, and have a high print-through level of the magnetic tape. The acicular magnetic iron oxide particles in which cobalt is coated only on the surface of the particles have improved these magnetic stabilities compared with the cobalt-doped type particles. The coercivity of the γ-ferric oxide particles with cobalt coated only on the surface is almost linearly increased in proportion to the amount of the cobalt coated, and the print-through of a magnetic tape is improved by 2 to 8 dB when using the magnetic iron oxide particles having cobalt coated only on the surface of the particles, in comparison with the unmodified magnetic iron oxide particles. However, when the amount of cobalt is much increased, the magnetic properties of the particles are disadvantageously changed over a period of time, and the pressure and thermal stabilities are deteriorated. Further, reducing the amount of cobalt is desirable from the viewpoint of the manufacturing cost.

As the magnetic powder for recording media, materials having not only a higher coercivity and a higher saturation magnetization but also a lower electrical resistance are desired. Also, as tapes for a VHS type video tape recorder (VTR), the tapes must be black, and therefore, magnetic materials having a high blackness are desired. Namely, the magnetic materials must be as black as possible. In magnetic tapes, particularly VTR tapes, an electrostatic charge is caused by the friction associated with high speed running of the tape. The electrostatic charge disturb the smooth running of tape on recording or play back operation. Also the dropout is caused by dust adhesion. The S/N ratio is dropped by the noise of discharge. These problems caused by the generation of an electrostatic charge can be eliminated by making the magnetic tape electrically conductive.

To give the magnetic powder for recording media a higher saturation magnetization and a lower electrical resistance, ferrous ion should be added to the surface of the particles. But the addition of ferrous ion is disadvantageous in that it causes high print-through level of a magnetic tape.

As a method for improving the coercivity and the saturation magnetization of magnetic particles, a method has been proposed in which cobalt is coated on iron oxide particles, in the presence of barium or strontium salt (Japanese Unexamined Patent Publication (Kokai) No. 57-198607); and a method in which cobalt and ferrous iron are coated on iron oxide particles in the presence of barium or strontium salt (Japanese Unexamined Patent Publication (Kokai) No. 57-181102). These methods comprise the addition of an aqeous cobalt salt solution and aqueous barium or strontium salt solution into an aqueous dispersion of iron oxide particles, and further, in the latter method, an aqueous ferrous salt solution, followed by the addition of an alkaline and heating to cause chemical reaction and modification of the iron oxide particles with cobalt and the other metals.

Nevertheless, although the reaction rates in these methods are higher, for example, the reaction is completed in 3 to 4 hours at a reaction temperature of 100° C., these methods have disadvantages in that the final product (magnetic particles) have a lower coercivity than the invention process product and the distribution of coercivity of the magnetic particles is wide. Because, it is difficult to uniformly coat cobalt on the surface of γ-ferric oxide particles, which means that a large amount of cobalt must be coated on the particles to attain a required coercivity. The ununiformity of coating of cobalt results in a wider coercivity distribution of the modified γ-ferric oxide particles.

SUMMARY OF THE INVENTION

The object of the invention is to provide a method for preparing magnetic iron oxide particles having excellent coercivity, saturation magnetization, electrical conductivity, and print-through level as well as a narrow coercivity distribution.

The above and other objects, features and advantages of the present invention are attained by a method for preparing magnetic particles of modified γ-ferric oxide particles for magnetic recording media, comprising dispersing γ-ferric oxide particles in an aqueous alkaline solution, adding a cobalt salt and at least one salt of calcium, strontium and barium salts to the solution to conduct a cobalt modification of the γ-ferric oxide particles, followed by adding a ferrous salt to the solution to conduct a ferrous ion modification of the cobalt-modified γ-ferric oxide particles, and then filtering and drying the resultant modified γ-ferric oxide particles.

DESCRIPTION OF THE PREFERRED EMBODIMENT

Figure 1:
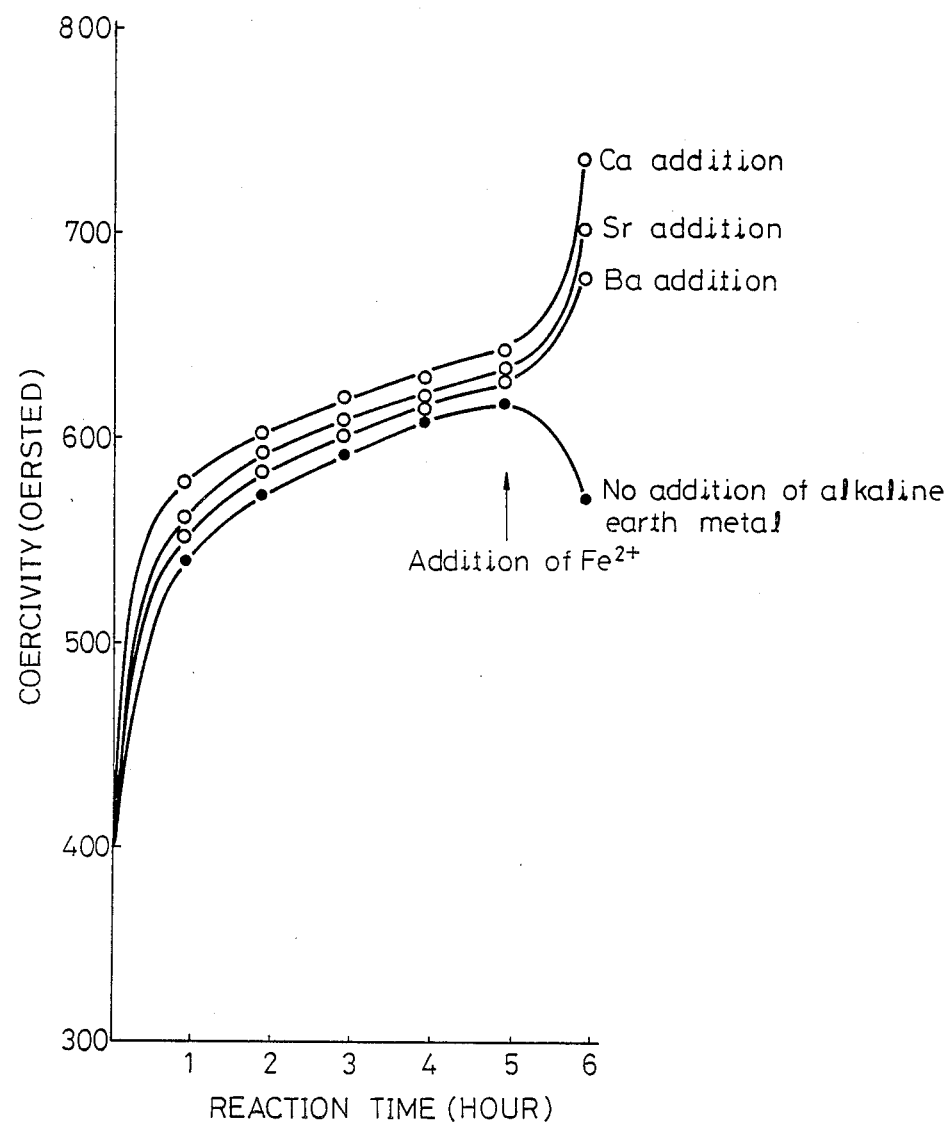
FIG. 1 is a graph showing changes in the coercivity caused by the addition of an alkaline earth metal and ferrous iron, wherein the ordinate indicates the coercivity $H_c$ of the product and the abscissa indicates the reaction time.

In a method according to the present invention, γ-ferric oxide particles dispersed in an alkaline solution are first modified with cobalt in the presence of an alkaline earth metal, and then modified with ferrous ion by adding a ferrous salt to the solution. These sequential steps are the essential feature of the present invention, by which it was found that the electrical conductivity, the saturation magnetization, etc., of the γ-ferric oxide particles are improved, and suprisingly, the coercivity of the particles is enhanced. If in the absence of an alkaline earth metal, γ-ferric oxide particles are first modified with cobalt and then with ferrous ion, the coercivity of the particles is reduced, which is the reverse of the effect of the present invention. This feature is illustrated below with reference to FIG. 1.

Further, if γ-ferric oxide particles are simultaneously modified with cobalt and ferrous ion by finally adding an aqueous alkaline solution after the cobalt and ferrous salts are added to the reaction solution, this method has a disadvantage in that the distribution of the coercivity of the particle becomes wider, as described before in relation to the prior art.

FIG. 1 shows the results of the following experiments: Gamma-ferric oxide was dispersed into a 6N-aqueous sodium hydroxide solution (100 g/l). At first, an alkaline earth metal chloride aqueous solution was added to the solution. The alkaline earth metal content was 0.5 wt % based on γ-Fe$_2$O$_3$. Then, a cobalt chloride aqueous solution was added to the solution. The cobalt metal content was 3.0 wt % based on γ-Fe$_2$O$_3$. The solution was heated at 100° C. to complete the cobalt modification of γ-Fe$_2$O$_3$. The relationship between the coercivity and the reaction time was examined. After 5 hours reaction, a ferrous chloride aqueous solution was added to the solution. The ferrous ion content was 5.0 wt % based on γ-Fe$_2$O$_3$. The reaction was continued for 1 hour at 100° C. to complete the ferrous ion modification of the iron oxide. THe coercivity of the resultant modified particles was determined, and the results are shown in FIG. 1, wherein the white circles indicate the modification with the addition of an alkaline earth metal salt, and the black circles indicate the modification without the addition of an alkaline earth metal, as a comparative. In FIG. 1, the ferrous chloride was added at the position shown by the arrow (after 5 hours reaction). The finally obtained modified γ-ferric oxide particles contained about 3 wt % of cobalt and about 5 wt % of ferrous ion, both based on the weight of the γ-ferric oxide.

As seen in FIG. 1, the coercivity of the cobalt-modified γ-ferric oxide particles is slightly improved by the addition of an alkaline earth metal salt in relation to that obtained when an alkaline earth metal salt was not added. More important, when ferrous chloride is added and followed by cobalt modification, the effects of ferrous ion modification on the coercivity of the particle are completely reversed between with an alkaline earth metal salt and without the salt. That is, the coercivity is abruptly increased if an alkaline earth metal salt is present, although the coercivity is reduced if that salt is not present.

This feature of the present invention allows a reduction of the amount of cobalt to attain a required coercivity.

Further, according to the method of the present invention, magnetic particles with a very narrow coercivity distribution can be obtained, as shown in the following examples.

Although the effects of the addition of an alkaline earth metal salt and a ferrous salt cannot be explained, it is considered that the alkaline earth metal serves as a catalyst to coat cobalt uniformly on the surface of γ-ferric oxide particles, followed by the formation of a magnetite or cobalt ferrite layer uniformly on the surface of the cobalt-modified γ-ferric oxide particles, which increases the coercivity of the particles. It is also supposed that a layer of crystalites, having a crystal structure similar to the magnetplumbite structure known in ferrite magnet, is formed. Further, it is also considered that the uniform coating of cobalt and ferrous ion on the particles bring narrow distribution of the coercivity.

The print-through is generally deteriorated by the addition of ferrous ion, but in the present invention, the improvement of the print-through by cobalt modification with an alkaline earth metal salt overcomes the deterioration of the print-through due to ferrous iron. Therefore, in the present invention, the print-through is finally improved.

The γ-ferric oxide particle size is about 0.2 to 0.8 μm length. The particles were dispersed in aqueous alkaline solution. This slurry content, namely the amount of γ-ferric oxide in the dispersion is within 80 to 150 g/l.

Preferably, the concentration of the aqueous alkaline solution is within 1 to 8 mole/l, as the OH$^-$ concentration. The higher the concentration of the alkaline solution, the higher the reaction rate. But, a higher concentration of the alkaline solution disadvantageously increases costs and the amount of washing water and washing time of the reaction product. Accordingly, 2 to 8 mole/l of the alkaline solution as the OH$^-$ concentration is more preferable.

As an alkali for the alkaline solution, potassium hydroxide, sodium hydroxide, lithium hydroxide and the like may be used; sodium hydroxide is advantageous in industrial application because of lower manufacturing cost.

The calcium, strontium, and barium salts may be any water soluble salt, including chlorides, bromides, iodides, acetates, formates, nitrates, etc.; chlorides being industrially advantageous because of lower manufacturing cost, etc. Preferably, the amount of addition of at least one of the calcium, strontium, and barium salts is within 0.01 to 3 wt % as the alkaline earth metal based on γ-Fe$_2$O$_3$. An amount of less than 0.01 wt % of the alkaline earth metal does not give sufficient effect, and an amount of more than 3 wt % of the alkaline earth metal makes no contribution to an increase of the magnetization.

The cobalt salt may be any water soluble salt iron, including cobalt chloride, cobalt nitrate, and cobalt sulfate. According to the present invention, the amount of cobalt for modification may be considerably reduced. For example, if 0.1 wt % of cobalt is added to γ-Fe$_2$O$_3$, the modification may be effective. The upper limit of the amount of cobalt is preferably about 10 wt %. The amount of addition of the cobalt salt is selected within the above-mentioned range. Generally, the amount of cobalt modification is in accordance with the amount of addition of the cobalt salt.

The alkaline earth metal salt and the cobalt salt are added as a solid or as an aqueous solution. There is not sequential order to the addition of these salts.

The slurry solution containing the γ-ferric oxide particles and the cobalt and alkaline earth metal salts, prepared as above, is heated under stirring. The reaction temperature is within 50° C. to the boiling point of the slurry. A higher reaction temperature facilitates the rate, but a pressurized reactor is required for higher temperature than boiling point, which is industrially disadvantageous. The boiling point of the solution depends on the concentration of the dissolved salts. The upper limit of the reaction temperature is about 104° C. Thus, preferably the heating temperature is selected to be within 50° C. to 104° C.

The reaction caused by heat is desirably conducted with stirring the solution, but the stirring causes to oxidize the ferrous ion and cobalt, and therefore, a non-oxidizing atmosphere is required. The reaction time is preferably 4 hours or more, more preferably, 4 to 8 hours.

By the above-mentioned treatment, at first, the cobalt salt is changed to cobalt hydroxide and coated on the surface of the γ-ferric oxide particles. Also, a major part of the alkaline earth metal is coated on the surface of the γ-ferric oxide.

After the cobalt modification is completed, the ferrous salt is added to the solution. As the ferrous salt, ferrous sulfate, ferrous chloride, etc., are used. The reaction is continued under same conditions. Preferably, the amount of modification of the ferrous ion is within 0.1 to 10 wt % as the metal ion, based on γ-$Fe_2O_3$.

The resulant γ-ferric oxide particles modified with cobalt and ferrous ion are filtered from the solution, repeatedly washed, and then dried to obtain the final product. The final product contains the alkaline earth metal, but it is no effect for the magnetic properties of the particles.

The method according to the present invention obtains iron oxide magnetic particles having excellent electrical conductivity, saturation magnetization and print-through, as well as high coercivity. Further, although the coercivity is usually by ferrous ion modification, according to the present invention the coercivity is remarkably increased even when the ferrous ion modification is carried out. As a result, the amount of cobalt modification can be reduced and the deficiencies such as instability of the magnetic properties due to an increased amount of cobalt.

The present invention is now described by the following examples, which are not intended to limit the scope of the present invention.

EXAMPLE 1

Into 4 liters of a 6N-aqueous solution of sodium hydroxide, acicular γ-ferric oxide particles having a mean particle length of 0.4 μm, an aspect ratio of 8, a coercivity $H_c$ of 390 oersteds, and a saturation magnetization $\sigma_s$ of 73.4 emu/g were dispersed, and while heating and stirring under a nitrogen gas flow, an aqueous solution containing 11 grams of $CaCl_2.6H_2O$ (0.5 wt % as Ca, based on γ-$Fe_2O_3$) dissolved in 100 ml of distilled water was added. Heating and stirring were continued, and when the temperature of the reaction solution reached 80° C., an aqueous solution of 57.2 g of $CoSO_4.7H_2O$ (3 wt % as Co, baesd on γ-$Fe_2O_3$) dissolved in 300 ml of distilled water was added to the solution and the temperature of the solution was raised to and kept at 100° C. for 5 hours, with stirring. After 5 hours, an aqueous solution of 97.5 g of $FeSO_4.7H_2O$ (5 wt % as Fe, based on the γ-$Fe_2O_3$) dissolved in 500 ml of distilled water was further added, and reaction was continued at 100° C. for a further one hour. Upon completion of the reaction, the particles were filtered, washed with water, and then dried at 100° C. The properties of the resultant magnetic particles are shown in Table 1.

In Table 1, $H_c$ denotes the coercivity, and $\sigma_s$ saturation magnetization.

The Print-through was measured in the following manner: The following composition was ground by a sand mill to prepare a magnetic coating paint, filtered, and then coated on a polyethylene terephthalate film 20 μm thick. A magnetic field of 2500 Gauss was applied to the coated film to align the magnetic particles and dried to form a coating with a dry thickness of 10 μm. The film was slit to ¼ inch (6.4 mm) wide and then print through of the film was measured according to JIS C-5542.

| Coating Composition: | |
|---|---|
| | (parts by wt) |
| Magnetic particles | 100 |
| Vinylchloride-vinylacetate copolymer (VAGH) | 25 |
| Rosin | 3 |
| Silicone oil | 1 |
| Lecithin | 0.2 |
| Toluene | 150 |
| Methyl isobutyl keton (MIBK) | 150 |

The distribution of the coercivity is expressed by ΔB/Bm, where ΔB denotes the difference of the magnetic flux density between a value of the magnetization increasing line and a value of the magnetization decreasing line of the magnetization hysteresis curve at a magnetic filed of 1500 oersteds, and Bm denotes the saturation magnetic flux density.

The larger value of Print through level indicates the improvements of Print through, and a smaller ΔB/Bm value indicates a preferably narrower distribution of the coercivity.

EXAMPLE 2

The procedures described in Example 1 were repeated except that the aqueous solution of calcium chloride in Example 1 was substituted by an aqueous solution of 6.1 g of $SrCl_2.6H_2O$ (0.5 wt % as Sr based on γ-$Fe_2O_3$) dissolved in 100 ml of distilled water. The magnetic properties of the resultant γ-ferric oxide particles are shown in Table 1.

EXAMPLE 3

The procedures in Example 1 were repeated, except that 3.56 g of $BaCl_2.2H_2O$ (0.5 wt % of Ba, based on γ-$Fe_2O_3$) was substituted for $CaCl_2.6H_2O$. The magnetic properties of the resultant γ-ferric oxide particles are shown in Table 1.

EXAMPLE 6 (Comparative)

The procedures in Example 1 were repeated except that an aqueous solution of calcium chloride was not used. The magnetic properties of the resultant γ-ferric oxide particles are shown in Table 1.

EXAMPLE 7 (Comparative)

57.2 g of cobalt sulfate ($CoSO_4.7H_2O$) and 97.5 g of ferrous sulfate ($FeSO_4.7H_2O$) (3 wt % as Co and 5 wt % as Fe, based on $\gamma$-$Fe_2O_3$ respectively) were dissolved in 3 liters of distilled water. A 400 g of $\gamma$-ferric oxide particles, which were the same as used in Example 1, was added to the solution and heated with stirring. When the temperature of solution reached 80° C. an aqueous solution of 960 g of sodium hydroxide dissolved in 1 liter of distilled water was added thereto. The temperature of the solution was raised to 100° C. due to the dilution heat, and the solution was kept at 100° C. with stirring for 4 hours. Upon completion of the reaction, the particles were filtered, sufficiently washed, and dried at 100° C. The magnetic properties of the resultant $\gamma$-ferric oxide particles are shown in Table 1.

EXAMPLE 8 (Comparative)

Example 7 was repeated except that 6.1 g of strontium chloride (0.5 wt % as Sr, based on $\gamma$-$Fe_2O_3$) was added simultaneously with sodium hydroxide. The magnetic properties of the resultant $\gamma$-ion oxide particles are shown in Table 1.

TABLE 1

|  |  | Reaction temperature (°C.) | OH Concentration (mol/l) | Amount of Addition (wt %) | | | $H_c$ (Oe) | $\sigma_s$ (emu/g) | Print-through (dB) | $\Delta B/Bm$ (at 1500 Oe) |
|  |  |  |  | Co | $Fe^{2+}$ | Alkaline earth metal |  |  |  |  |
| --- | --- | --- | --- | --- | --- | --- | --- | --- | --- | --- |
| Example | 1 | 100 | 6 | 3 | 5 | Ca 0.5 | 734 | 78.3 | 58.7 | 0.017 |
| Example | 2 | 100 | 6 | 3 | 5 | Sr 0.5 | 702 | 79.0 | 57.9 | 0.019 |
| Example | 3 | 100 | 6 | 3 | 5 | Ba 0.5 | 675 | 78.5 | 57.3 | 0.018 |
| Example | 4 | 104 | 3 | 2.5 | 5 | Ca 0.2 | 680 | 77.0 | 57.0 | 0.016 |
| Example | 5 | 80 | 3 | 2 | 4 | Sr 0.3 | 630 | 75.2 | 58.2 | 0.018 |
| Example (Comparative) | 6 | 100 | 6 | 3 | 5 | — | 568 | 77.8 | 53.8 | 0.025 |
| Example (Comparative) | 7 | 100 | 6 | 3 | 5 | — | 560 | 76.3 | 53.6 | 0.042 |
| Example (Comparative) | 8 | 100 | 6 | 3 | 5 | Sr 0.5 | 570 | 77.0 | 53.0 | 0.040 |
| Starting $\gamma$-ferric oxide | — | — | — | — | — | — | 390 | 73.4 | 50.2 | 0.015 |

Note
The amount of addition is based on $\gamma$-$Fe_2O_3$
In example 4, a mixed solution of $CaCl_2.6H_2O$ and $CoCl_2.6H_2O$ was added.

We claim:

1. A method for preparing magnetic particles of modified $\gamma$-ferric oxide particles for magnetic recording media, comprising the steps of:
   first dispersing $\gamma$-ferric oxide particles in an aqueous alkaline solution having an OH concentration within 1.0 to 8.0 mol/l,
   then adding a cobalt salt and at least one salt selected from the group consisting of a calcium salt, a strontium salt and a barium salt, in an amount of 0.01 to 3 wt. % based on the amount of $\gamma$-ferric oxide, to the solution and heating such at a temperature of 50°–104° C. with stirring in a non-oxidizing atmosphere to conduct cobalt modification of the $\gamma$-ferric oxide particles,
   followed by adding a ferrous salt to the solution to conduct ferrous ion modification of the cobalt-modified $\gamma$-ferric oxide particles, said ferrous ion modification being effected at a temperature of 50°–104° C. with stirring in a non-oxidizing atmosphere, and
   then filtering and drying the resultant $\gamma$-ferric oxide particles.

2. A method according to claim 1, wherein the amount of modification of the $\gamma$-ferric oxide particles with cobalt is within 0.1 to 10 wt % based on the $\gamma$-ferric oxide.

3. A method according to claim 1, wherein the amount of modification of the cobalt-modified $\gamma$-ferric oxide particles with ferrous ion is within 0.1 to 10 wt % based on $\gamma$-ferric oxide.

* * * * *